G. W. WILMOT.
DRIVE CHAIN.
APPLICATION FILED DEC. 26, 1912. RENEWED JUNE 15, 1914.
1,109,809.
Patented Sept. 8, 1914.
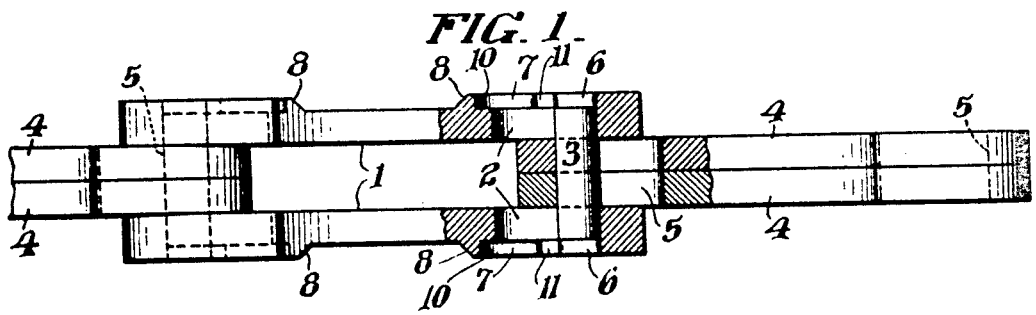
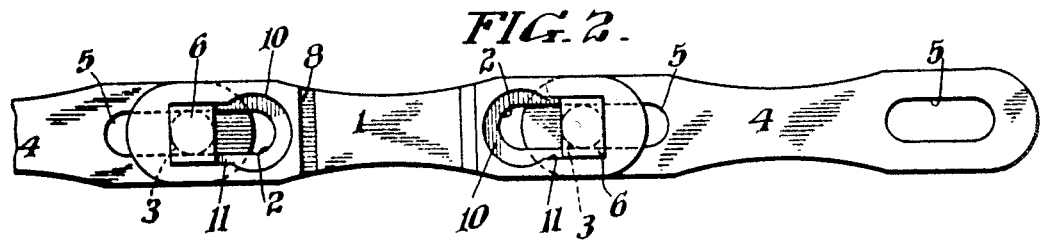
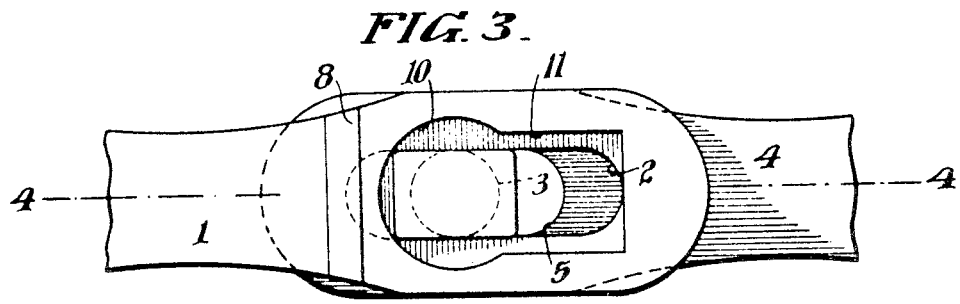
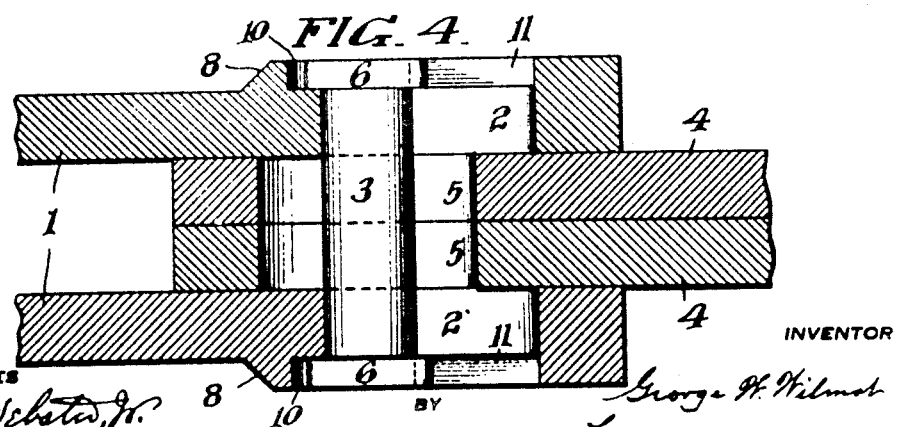
WITNESSES
Daniel Webster Jr.
Carrie E. Kleinfelder
INVENTOR
George W. Wilmot
Cyrus N. Anderson
ATTORNEY

UNITED STATES PATENT OFFICE.

GEORGE W. WILMOT, OF HAZLETON, PENNSYLVANIA.

DRIVE-CHAIN.

1,109,809.  Specification of Letters Patent.  Patented Sept. 8, 1914.

Application filed December 26, 1912, Serial No. 738,653. Renewed June 15, 1914. Serial No. 845,294.

*To all whom it may concern:*

Be it known that I, GEORGE W. WILMOT, a citizen of the United States, and a resident of Hazleton, county of Luzerne, State of Pennsylvania, have invented certain new and useful Improvments in Drive-Chains, of which the following is a specification.

My invention relates to improvements in drive chains of the character in which the links are detachably connected together by means of removable pintles.

It has for one of its objects to provide an improvement in the means of securing the pintles in position to prevent accidental removal thereof and the consequent accidental disconnection of the links of the chain.

Other objects and advantages of my invention will be referred to in the detailed description thereof which follows or will be apparent therefrom.

One form of a convenient embodiment of my invention is illustrated in the accompanying drawings to which reference may be had for a clear understanding of the same, and in which,—

Figure 1 is a view partly in plan and partly in horizontal section of a portion of chain embodying my invention; Fig. 2 is a side elevation of the same; Fig. 3 is a side elevation of the adjacent connected ends of two links in position to permit the removal of the pintle; and Fig. 4 is a horizontal section on the line 4—4 of Fig. 3.

Having reference to the drawings, 1 designates a link consisting of two parallel spaced members, as indicated, which members are provided at their opposite ends with straight sided elongated slots 2 having rounded ends as shown and in which slots pintles 3 are mounted. As will be hereinafter explained these pintles are held in stationary position in the slots with respect to the members of the link 1 except when they occupy certain predetermined positions therein for the purpose of being removed.

4 designates a link consisting of two parallel adjacent members as shown, each of said members being provided at its opposite ends with elongated slots 5 having rounded ends as is best shown in Figs. 2 and 3 of the drawings. Although the link 4 is shown as consisting of two parallel adjacent members it is obvious that said link may consist of a single integral member if such integral construction shall be preferred.

It will be understood, of course, that the links 1 and 4 alternate with each other. The pintles 3 supported upon the opposite ends of links 1 of a chain extend through the elongated openings 5 in the links 4 whereby the latter are pivoted thereon. In other words during the normal operation of the chain the pintles 3 are relatively stationary with respect to links 1 upon which they are supported and any change in the angular relation between any two or more adjacent links is effected by a pivotal movement of the links 4 upon the pintles 3.

Each of the pintles 3 is provided at its opposite ends with elongated rectangular heads 6 which occupy recesses 7 upon the outer sides of the members of the links 1 at their opposite ends. These recesses are formed in what may be termed projections or bosses 8 upon the outer sides of the members of the links 1 at their opposite ends and their formation in such projections or bosses does not injuriously affect the strength of the chain or its lasting or wearing qualities. These recesses respectively comprise a circular portion 10 and a polygonal portion 11, the latter portion being, in fact, substantially rectangular in outline. The width transversely of the length of the links 1 of the circular portion 10 is greater than the width in a similar direction of the polygonal portion 11. The width of the latter portion is substantially equal to the length of the rectangular heads 6 upon the opposite ends of the pintles 3 so that when the said heads occupy the positions shown in Figs. 1 and 2 the said pintles are prevented from turning with respect to the links 1 upon which they are supported. When, however, the pintles have been moved toward the center of links 1 so that the heads 6 are brought within the region of the circular portions 10 of the recesses 7 which surround the elongated slots 2 in the members of the links 1, the said heads and consequently the pintles 3 are permitted to turn so that said heads may occupy a horizontal position as shown in Figs. 3 and 4 of the drawings in which position they may be passed through the slots 2 and 5 of the links 1 and 4 and the said links thereby disconnected from each other. It will be understood that in order to move the pintles inwardly toward the center of link 1 an adjacent link 4 connected thereto may be moved inwardly toward the center of said link 1 thereby bringing the inner end of the slot 5 through which the said pintle extends into contact with such pintle thereby moving the latter inwardly so as to bring the heads 6 into positions within the region of the enlarged portions 10 of the recesses 7 after which the said pintle may be turned so as to bring the heads 6 into horizontal position shown in Figs. 3 and 4 after which, if the slots 2 and 5 in the links 1 and 4 register with each other, the said pintle may be removed.

By forming bosses or projections upon the outer sides of the opposite ends of the members of the links 1 and forming recesses of the character illustrated therein surrounding the elongated slots 2, I provide means whereby the pintles are held in position with sufficient security to prevent accidental removal thereof without, however, decreasing in the slightest degree the normal strength of the links themselves. By such construction I am enabled to terminate each end of the respective slots 2 with rounded ends instead of having one of the said ends squared. This is a decided advantage in view of the well known fact that the termination of such slots with a squared end renders the link much more liable to be fractured. Also the fact that slots in the respective links are straight from end to end, whatever their length, is of great advantage because if such slots were provided with enlargements therein at points intermediate their ends the links when embodied in the chain and subjected to the strains incident to usage would be likely to bend and become distorted from their original shape.

The purpose of the enlarged portions 10 of the recesses 7 is to permit the turning of the heads 6 at the opposite ends of the pintles to remove the latter and, therefore, it will be understood that although shown as being circular the shape of such enlarged portions is a matter of indifference. The heads 6 are prevented from turning by the fact that normally they occupy positions in the polygonal portions 11 of the recesses 7; hence the portions of the projections or bosses 8 beyond the said polygonal portions of the recesses toward the centers of the members of the links 1 may be omitted if desired. It is obvious that if thus omitted the pintles may be turned and the links disconnected from each other in the manner hereinbefore described.

I claim:—

1. A chain comprising links provided with elongated straight sided slots at their opposite ends and also provided with recesses in the outer sides of their opposite ends, the said slots extending from the bottoms of said recesses, and which recesses respectively comprise an enlarged portion and a polygonal portion of less width, pintles supported in the opposite ends of the said links, the said pintles having elongated heads which are adapted normally to be situated in the polygonal portions of the said recesses, and the said pintles being adapted to be moved into positions with their heads within the region of the enlarged portions of the said recesses for the purpose stated, and alternate links having elongated openings at their opposite ends through which the said pintles extend whereby the said last mentioned links have pivotal connection with the first mentioned links.

2. A chain comprising links having elongated straight slots, pintles situated at the opposite ends of the said links, and supported in the said slots, the said pintles having heads at their opposite ends with squared ends and the said links being provided with bosses or projections upon their outer sides at their opposite ends which projections are provided with recesses from the bottoms of which the said slots extend and each of which recesses includes a circular and a polygonal portion, the former being of a width greater than that of the latter, and the width of the latter being substantially equal to the length of the said heads whereby when the said heads are situated within the said polygonal portions of the said recesses they are prevented from turning, but which heads are permitted to turn when the pintle is moved toward the centers of the said links bringing the said heads within the region of the circular portions of the said recesses and alternate links having slots through which the said pintles extend whereby the said last mentioned links have pivotal connection with the first mentioned links.

3. A chain comprising links consisting of two members in parallel spaced relation with respect to each other and each of the said members being provided with slots and also with projections or thickened portions upon their outer sides at their opposite ends, the said projections or thickened portions being provided with recesses from the bottoms of which the said slots extend and each of which comprises a circular and a rectangular portion, pintles supported in said slots and having rectangular heads at their opposite ends, the said heads normally occupying the rectangular portions of the said recesses and being of a length substantially equal to the width of such portions of said recesses whereby the pintles are prevented from turning, and the said pintles being adapted to be moved toward the center of said members to bring the said heads within the region of the circular portions of said recesses whereby the said heads may be turned to bring them into parallel relation with the said slots, and alternate links having their opposite ends situated intermediate the ends of the members of the first mentioned links and having elongated slots through which the said pintles pass whereby they are pivotally connected to the first mentioned links.

In testimony that I claim the foregoing as my invention, I have hereunto signed my name this 18 day of December, A. D. 1912.

GEORGE W. WILMOT.

In the presence of—
JOHN J. KELLEY,
DAISY TEMPLE.